US008266277B2

(12) United States Patent
Duggan et al.

(10) Patent No.: US 8,266,277 B2
(45) Date of Patent: Sep. 11, 2012

(54) METHOD AND SYSTEM FOR RESOURCE MANAGEMENT IN A COMPUTING ENVIRONMENT

(75) Inventors: Matthew E. Duggan, Chertsey (GB); Daniel J. Martin, Pawling, NY (US); Erik McCallum, London (GB)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 12/492,068

(22) Filed: Jun. 25, 2009

(65) Prior Publication Data
US 2010/0332645 A1     Dec. 30, 2010

(51) Int. Cl.
*G06F 15/173*     (2006.01)
(52) U.S. Cl. ...................................... 709/224
(58) Field of Classification Search .................. 709/201, 709/202, 203, 207, 220, 223, 224, 245
See application file for complete search history.

(56) References Cited

U.S. PATENT DOCUMENTS
2003/0009552 A1* 1/2003 Benfield et al. ............... 709/224

OTHER PUBLICATIONS

IBM, "Netcool + Tivoli: delivering service management innovation," Aug. 2006, pp. 1-28, downloaded at ftp://ftp.software.ibm.com/software/tivoli/whitepapers/GC28-8458-00.pdf.
HP OpenView, http://en.wikipedia.org/wiki/OpenView, download date Jun. 25, 2009, pp. 1-5.

* cited by examiner

*Primary Examiner* — Joseph Avellino
*Assistant Examiner* — Marshall McLeod
(74) *Attorney, Agent, or Firm* — DeLizio Gilliam, PLLC

(57) ABSTRACT

A method and system for monitoring resources in a network of resources in a computing environment, is provided. One implementation involves discovering resources in the network; constructing a topology model including event information for each discovered resource; providing queries for polling the models for event information, such that the resources need not be polled; executing one or more queries against one or more models; evaluating the query results to ascertain whether or not an event has affected what is considered to be normal for the result of each query; and presenting the evaluation results to enable monitoring of the resources.

1 Claim, 4 Drawing Sheets

METHOD AND SYSTEM FOR RESOURCE MANAGEMENT IN A COMPUTING ENVIRONMENT

BACKGROUND OF THE INVENTION

1. Field of the Invention

The invention relates generally to resource management, and in particular, to monitoring resources in a computing environment.

2. Background Information

A business typically uses a number of hardware and software assets to support the operation of the business and to provide services to customers. These assets typically include traditional computing hardware such as workstations, servers and printers, network hardware such as routers, switches and firewalls, and software assets such as billing systems, customer databases and network management applications.

To effectively manage these assets, businesses typically make use of a number of specialist software applications that are focused on addressing a specific need. For example, a network management application focuses on managing the computing and network assets used by the business. Typically, such applications employ various techniques to manage the assets, such as: Discovery technology to find assets and the relationships between them; A model, typically based on a standard, such as Distributed Management Task Force Common Information Model (DMTF CIM), and typically implemented using an relational database management system (RDBMS); A user interface that allows the user to interact with the managed resources; A configuration mechanism that allows the behavior of the management application to be tailored to suit the business needs; An event/alarm database and associated functions such that the resources may be actively polled or that events/alarms originating from the managed resources may be categorized, managed, and archived; A system, commonly referred to as a Root Cause Analysis (RCA) engine, that attempts to identify the impact of events/alarms in context of the topology held in the applications model; etc.

A summary of certain characteristics of how resources are typically monitored is provided below. An example is that which typically results in an event or alarm being created, updated or deleted in an event management system (such as IBM Tivoli Netcool Omnibus). A resource may be actively monitored by a management application in a number of ways including, but not limited to, ICMP echo polling (pings) and Simple Network Management Protocol (SNMP) data retrieval. A management application may passively listen for alarms originating from managed resources. Typically these include SNMP traps or informs. A management application may parse log files generated by resources for specific information. The management application may use resource-specific probes to obtain information in a resource-specific way, such as via a published API (Application Programming Interface). Events or alarms resulting from the points identified above typically have a notion of severity that indicates how the event should be considered with respect to whether or not it is a problem or resolution. Varying degrees of severity are typically provided for, such as clear (a resolution event), warning (be aware of a certain condition) and critical (a managed resource has a problem that requires attention). A management application may apply some additional processing to events or alarms relating to resources. This processing includes thresholding of data to upgrade or downgrade severity if an aspect of the event/alarm data exceeds or drops below an arbitrary threshold, or considering an event or alarm with respect to a topology or resource model. Although such techniques may satisfy typical use-cases, the monitoring capabilities of management applications remain limited.

SUMMARY OF THE INVENTION

The invention provides a method and system for monitoring resources in a network of resources in a computing environment. One embodiment includes: discovering resources in the network; constructing a topology model including event information for each discovered resource; providing queries for polling the models for event information, such that the resources need not be polled; executing one or more queries against one or more models; evaluating the query results to ascertain whether or not an event has affected what is considered to be normal for the result of each query; and presenting the evaluation results to enable monitoring of the resources.

These and other features, aspects and advantages of the invention will become understood with reference to the following description, appended claims and accompanying figures.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
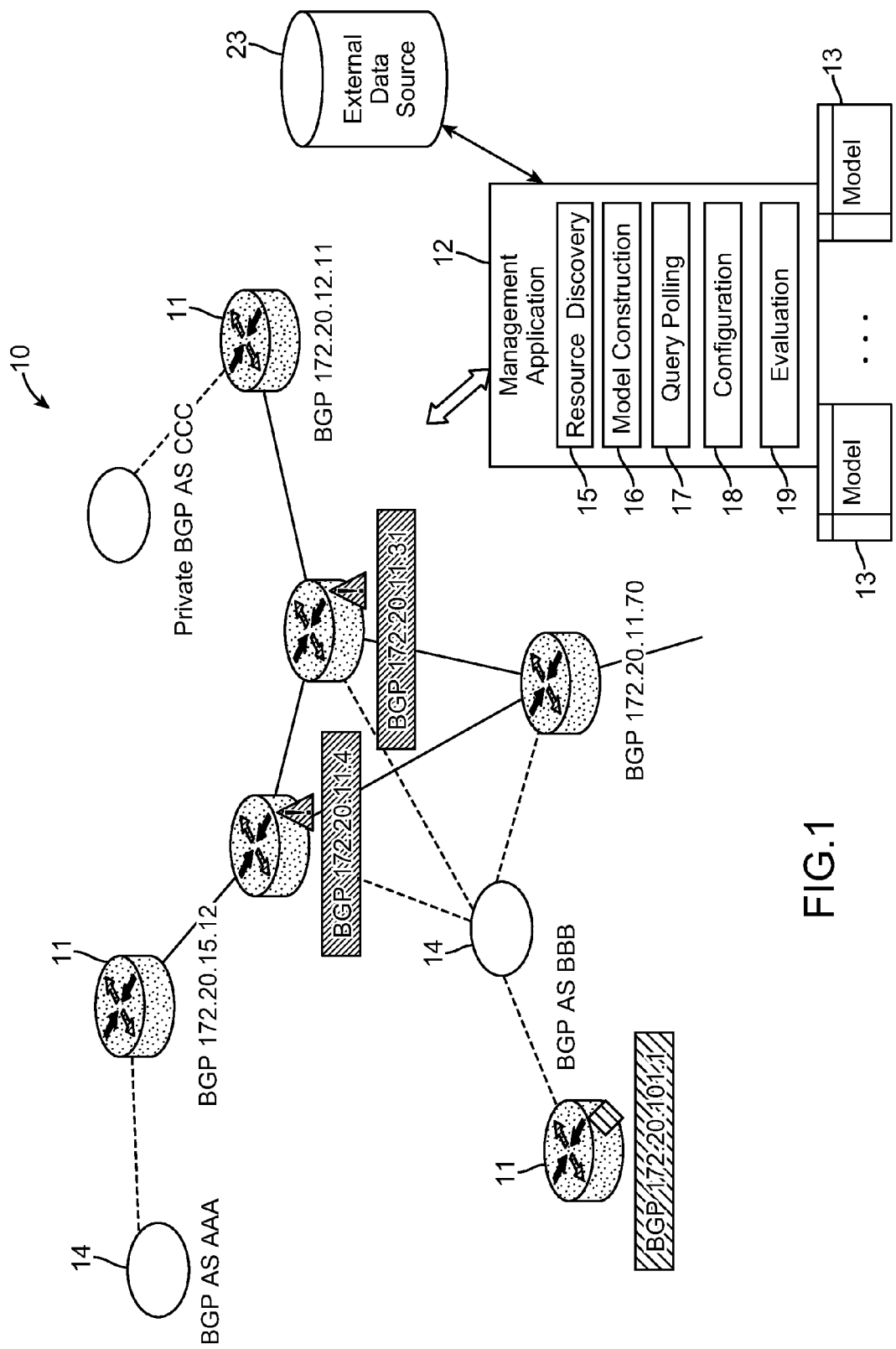
FIG. 1 shows a functional block diagram of a system implementing resource management including resource monitoring, in a computing environment, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for enhancing the management of managed resources in a computing environment, by improving monitoring capabilities through the use of external data sources. One embodiment includes utilizing topology and resource models to enhance resource monitoring capabilities. Arbitrary queries against a set of data are utilized to ascertain whether or not an event has affected what is considered to be normal for the result of the query. The topology and resource model may include data and concepts that are not native to a specific application, further enhancing monitoring functions (such as monitoring and Root Cause Analysis (RCA) capabilities). This enhances monitoring and RCA capabilities against managed resources using a topology and resource model such that the resources need not be actively or passively polled.

Users are provided with a mechanism for defining arbitrary queries to be made under a specific condition such that an evaluation can be made as to whether or not a deviation from the expected results set has been made. The topology and resource model polls may be changed such that they may be assembled to perform a set of tasks against a topology or resource model. A computing device that gains or loses redundancy of either internal components, such as redundant power supplies and/or connectivity to other devices and/or networks, is identified. It is verified that a given service or application depends on an expected set of computing and/or network hardware and/or associated software applications or configuration. It is further verified that a given resource is related to an expected set of resources by utilizing connectivity, containment, dependency and membership relationships. One example involves ensuring that an Open Shortest Path First (OSPF) router is connected to a set of expected OSPF routers via a set of ports/interfaces and that these resources are in specific OSPF areas.

One implementation involves enhancing the monitoring capabilities of management applications (e.g., management software applications) by treating the topology or resource models held by management applications as a source of pollable data. This need not be the same as RCA although the invention may be used to further enhance RCA capabilities. This is because the data retrieved by management application discovery systems is typically subject to data processing such that a defined topology and resource model is constructed. The invention provides a process to use topology and resource models used by management applications, to enhance the monitoring capabilities of management applications. Models may include a variety of concepts such as information about:

Computing devices and their physical and logical components such as slots, cards and ports.

Services and applications that run on or are provided by the computing devices.

Configuration information pertaining to devices, services and applications.

Connectivity relationships, such as the connection between two devices.

Collection relationships, such as those used to describe Internet Protocol version 4 (IPv4) subnets.

Dependency relationships, such as those used to describe the notion that a service, such as a web server, depends on a number of other components such as the server, the ports and configuration.

Consider an example scenario, whereby a network management application, such as IBM Tivoli Network Manager IP Edition, is managing a set of network resources and includes a model that contains information including connectivity data, relationships between resources, device containment data, and relationships between components of a device. Referring to the functional block diagram of a computing environment 10 in FIG. 1, according to an embodiment of the invention, users are provided with enhanced management capabilities for devices such as Border Gateway Protocol (BGP) connectivity between managed resources. The computing environment 10 comprises a network in which a number of resources 11 (e.g., BGP speaking routers) are connected together.

A management application 12 maintains a topology and/or device resource model 13 of each of the resources 11. The model 13 includes data and concepts for the specific application. In one example, each topology model 13 includes event information for a corresponding resource 11. A model 13 may be based on a standard, such as Distributed Management Task Force Common Information Model (DMTF CIM), and implemented using a relational database management system (RDBMS). A model 13 may include data and concepts that are not native to a specific application, further enhancing monitoring functions such as RCA capabilities. This enhances monitoring and RCA capabilities against managed resources using the topology and resource model 13 such that the resources need not be actively or passively polled.

Each BGP speaker 11 is connected to at least one other BGP speaker 11. The BGP speakers 11 are members of an Autonomous System (AS) 14 which is identified by a number, and can be resolved to a name (e.g., AAA, BBB and CCC). The BGP speakers 11 may be connected to other BGP speakers that are in networks not managed by the user of the management application 12. In this scenario, the BGP speakers and the Autonomous System are a member of, or are part of, the topology model but are not managed.

The management application 12 implements enhanced monitoring and/or RCA capabilities by referencing external data sources. External data sources include, for example, application-specific databases, Configuration and Change Management Databases (CCMDBs), file systems and Application Programming Interfaces (APIs). As such, monitoring functions of the management application 12 perform database or API queries against a topology and/or device resource models 13, wherein the queries enable retrieving a set of data to be evaluated in the context of a regular resource poll (typically performed by management applications).

In one example, a user of the management application 12 is interested in knowing that the BGP speaker BGP 172.20.11.4 in Autonomous System BBB is peering with, or is connected to, other BGP speakers that are themselves members of an Autonomous System. It is assumed the computing environment (e.g., BGP network) 10, being managed by the management application 12, has a typical behavior whereby each BGP speaker is expected to be peering with a given number of other BGP speakers in specific Autonomous Systems. The user requests information about whether peering relationships of any of the BGP speakers deviate from the expected behavior and, if so, what such deviations are.

In order to satisfy this request, the management application 12 performs a query (i.e., query polling) of the resource topology models 13 to identify the set of connections and autonomous system membership for each BGP speaker. This requires two steps: one is to identify a query which returns the requested information, and the other is to define normal peering relationships such that a deviation from normal peering relationships can be detected.

Figure 2:
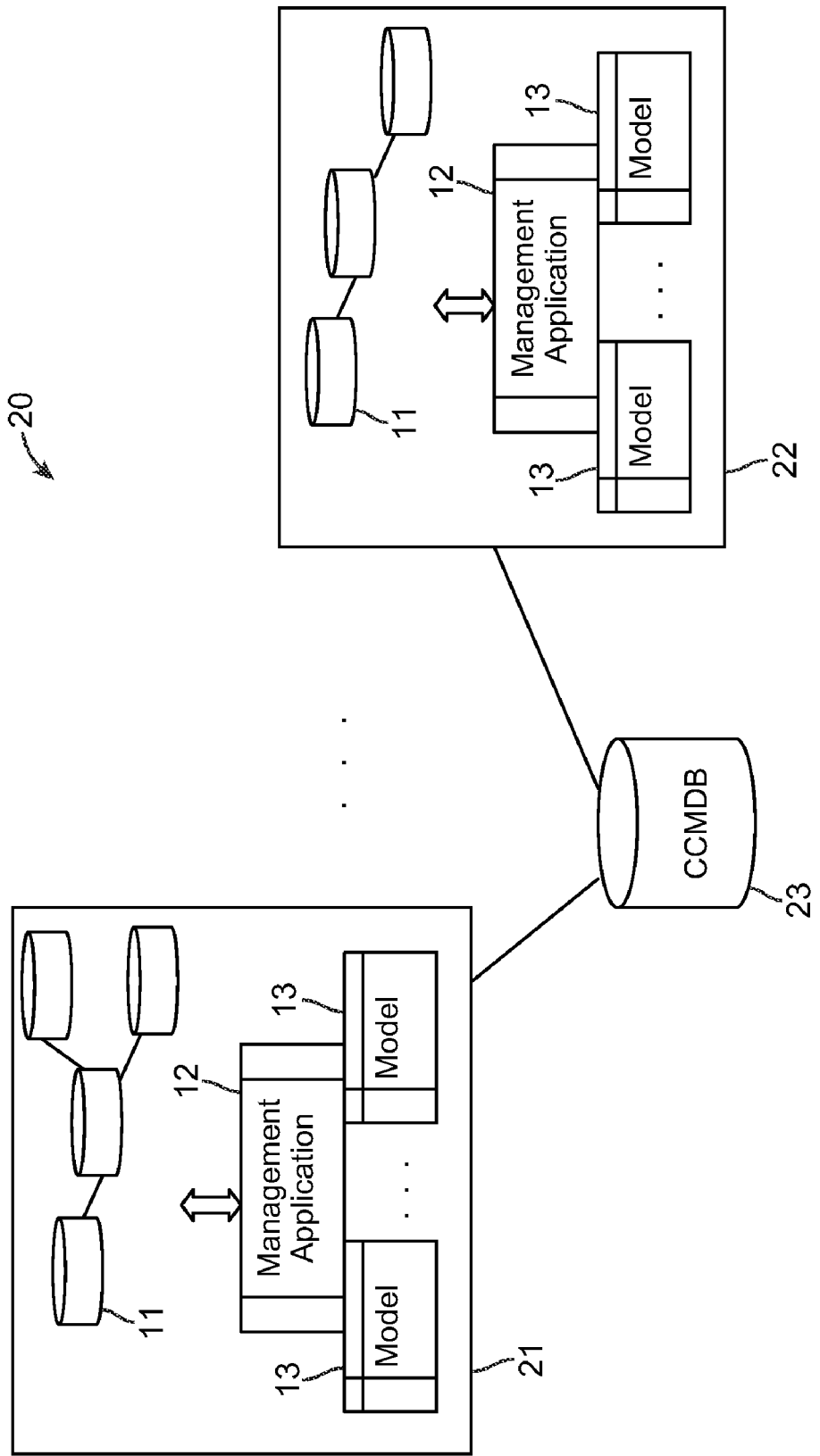
FIG. 2 shows a functional block diagram of a system implementing resource management for multiple networks, according to an embodiment of the invention.

Any query can be performed, and, as a result, a significantly large number of scenarios may be considered for query polling. Referring to the example computing network 20 in FIG. 2 including multiple managed networks (e.g., networks 21, 22), according to an embodiment of the invention, such query polling may further include querying an external data source 23 such as a CCMDB. A CCMDB federates the data from a number of management applications 12 and, as a result, provides the ability to greatly enhance the scope of query polling to make use of data that is not natively available to any one management application 12. Furthermore, the invention provides sets of query polls that can be evaluated against a topology or resource models 13, the benefits of which are further enhanced if the topology or resource models are kept up-to-date by corresponding management applications 12 to reflect changes in the managed resources 11.

Figure 3:
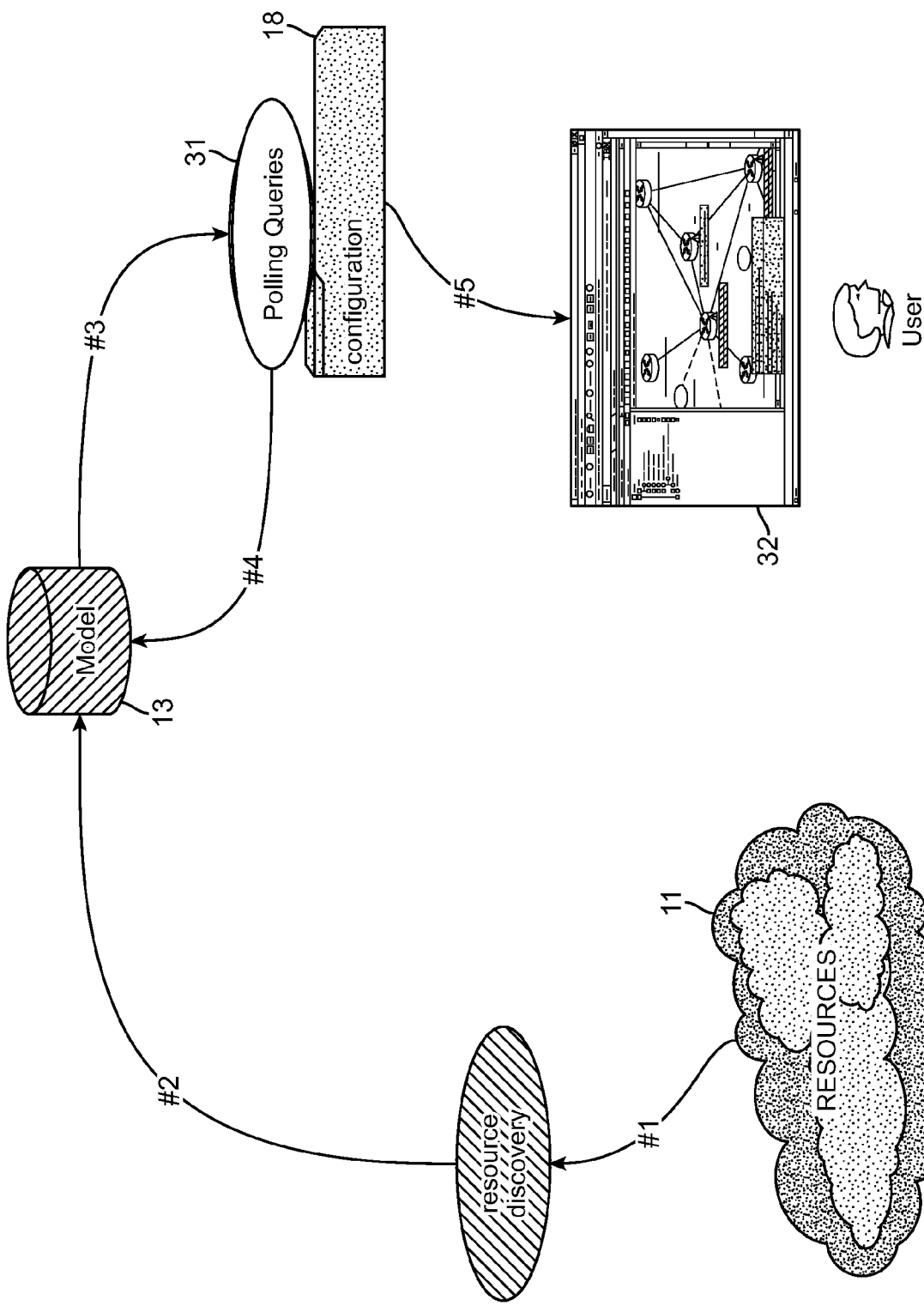
FIG. 3 shows a process for resource management in a computing environment, according to an embodiment of the invention.

FIG. 3 shows an example process 30 for a management application 12 utilizing the topology or resource models 13, according to an embodiment of the invention. In process block 1, a resource discovery module 15 (FIG. 1) of the management application 12 (FIG. 1) discovers the managed resources 11. In process block 2, a model reconstruction module 16 (FIG. 1) of the management application 12 constructs a model 13 for each discovered resource 11. A query polling module 17 (FIG. 1) of the management application 12 maintains a set of queries 31, wherein each query defines a data polling function. The definitions may include metadata that describes a data poll and may include aspects such as a user friendly description, periodicity, triggering and thresholding. The definition provides a query that retrieves data that can be evaluated.

A user utilizes a user interface 32 to interact with the management application 12. When the user requests information about whether peering relationships of any of the resources 11 deviate from the expected behavior (and if so, what such deviations are), in process block 3, a query polling module 16 of the management application 12 executes one or more polling queries 13 to query the resource topology models 13 to identify the set of connections and autonomous system membership for each discovered resource 11. As noted, this involves identifying a query which returns information about peering relationships of any of the resources 11, and detecting which peering relationships deviate from normal.

In process block 4, a configuration module 18 (FIG. 1) of the management application 12 uses metadata to ascertain whether or not each query definition for polling queries 13 requires reevaluation or re-execution based on certain conditions. An example condition involves when a definition is making use of a trigger that executes a query based on another event, such as an Simple Network Management Protocol (SNMP) link down trap, wherein the configuration module 18 executes the relevant definitions for reevaluation of the results.

An evaluation module 19 (FIG. 1) of the management application 12 evaluates the query results and presents them to the user (e.g., via the user interface 32 including event lists and topology maps, or via e-mails and SMS messages, etc.). In one example, a user defines queries to be made under a specific condition such that an evaluation can be made as to whether or not a deviation from the expected results set has been made. The results include information about whether peering relationships of any of the resources 11 deviate from the expected behavior, and if so, what such deviations are.

Table 1 below provides example pseudo code, demonstrating the above process in conjunction with FIGS. 1 and 3. Assume that the management application 12 has discovered the managed resources 11 and constructed an appropriate model 13 for each resource. Furthermore, assume that the focus of a query poll is to ascertain the BGP peering characteristics of BGP 172.20.11.4 in FIG. 1, and that metadata is defined such that the query poll is executed on receipt of an SNMP link down trap on BGP 172.20.11.4.

TABLE 1

```
let resourceId = 'BGP 172.20.11.4'
let events = the set of events in the management application
let event = 'Link Down Trap for BGP 172.20.11.4'
// an event in the set of events
events.add(event);
let definitions = the set of definitions in the present invention
let definition = { name = 'BGP Validation',
// name of the definition
          triggerOn = 'Link Down Trap',
// the type of thing fireing the trigger
          action = "
// No resulting action from the trigger
          triggeringResource = ['BGP 172.20.11.4','BGP 172.20.15.12',...],   //the
set of resources that fire the poll
          periodicity = 'Listen',                                           // how
to evaluate the meta data, i.e.
          queryType = 'RDBMS',
// the type of query to make, i.e. API/DB
          query = 'SELECT ... FROM topology WHERE resourceId = ?',
// the query to use, replace ? with id
          normal = [{BGPAS=AAA, ROUTER='BGP 172.20.15.12'},
// what is considered to be 'normal'
                   {BGPAS=BBB, ROUTER='BGP 172.20.11.31'},
                   ...] }
definitions.add(definition);
...assume model is up-to-date
foreach definition in definitions
{
    // evaluate against the events in the system and the list of triggering resources
    if definition.hasEventsForTriggeringResource( )
    {
        foreach affectedResource in getResourcesForDefinition(definition)
// the set of resources to query for
        {
            let results = fireQuery(definition.getQuery( ), affectedResource)
// the results of the query for resource
            // i.e. we use the resource Id in the query
            if results != definition.getNormal( )
            {
                //
                // perform an action such as raise event, escalate, run
another definition etc
                if definition.hasAction( )
```

TABLE 1-continued

```
                //
                // perform an action
            }
        }
    }
}
```

Though the resources 11 are shown as routers in the above example, the invention is useful with networks including other resources. As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 4:
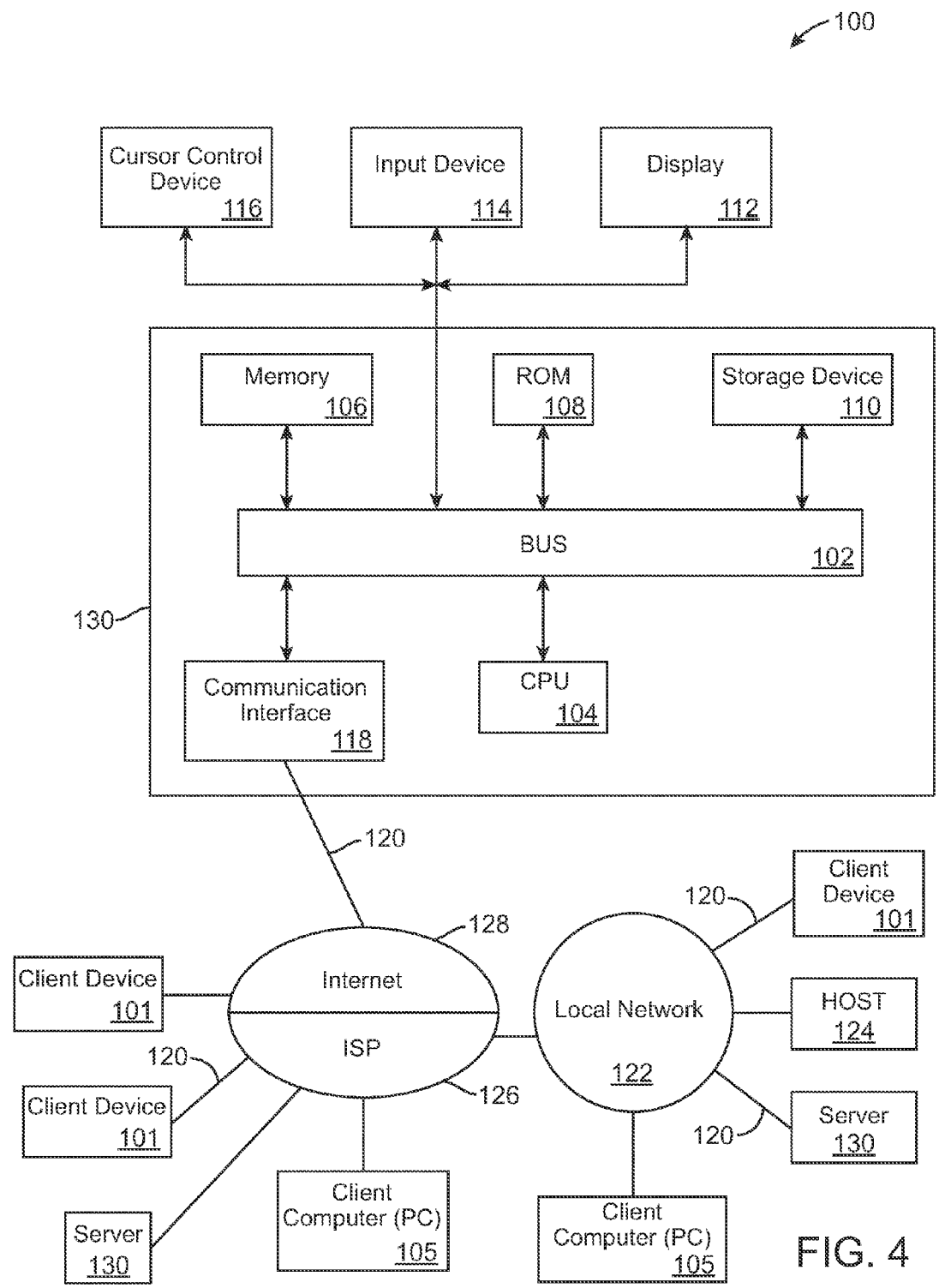
FIG. 4 shows a functional block diagram of an example computing environment for an embodiment of the invention.

FIG. 4 shows a block diagram of an example architecture of an embodiment of a system 100 that may perform the processes described above, according to an embodiment of the invention. The system 100 includes one or more client devices 101 connected to one or more server computing systems 130. A server 130 includes a bus 102 or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of monitoring resources in a network of resources in a computing environment, comprising:
constructing a topology model including event information for each resource in the network;
storing user-defined queries for polling one or more of the topology models for event information wherein the resources need not be polled, and wherein each user-defined query includes a normal result set for the user-defined query;
polling by executing one or more of the user-defined queries against one or more of the topology models to obtain corresponding polling query results;
employing a processor to evaluate each polling query result in relation to the normal result set for the corresponding user-defined query to ascertain whether an event has resulted in a deviation from the normal result set; and
presenting the evaluation results to a user to enable monitoring of the resources.

* * * * *